3,646,134
BIS-METHYLENE-AMIDES OF PHOSPHORIC ACIDS
AND THEIR THIO-DERIVATIVES
Klaus Hunger, Kelkheim, Taunus, Germany, assignor to
Farbwerke Hoechst Aktiengesellschaft vormals Meister
Lucius & Bruning, Frankfurt am Main, Germany
No Drawing. Filed Feb. 4, 1969, Ser. No. 796,581
Claims priority, application Germany, Nov. 28, 1968,
P 18 11 351.4, P 18 11 352.5
Int. Cl. C07f 9/22, 9/24, 9/44
U.S. Cl. 260—551 P                    5 Claims

ABSTRACT OF THE DISCLOSURE

Bis-methylene amides of phosphoric or phosphoric acid, and their thio derivatives, useful as lubricant additives having antioxidant and thermal-stabilizing properties, of the formula

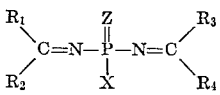

wherein $R_1$–$R_4$, taken alone, are the same or different and are alkyl, cyclohexyl, phenyl, mono- or di-chloro- or bromophenyl, or alkylphenyl; or $R_1$ and $R_2$, taken together, or $R_3$ and $R_4$, taken together, are alkylene; X is alkyl, cyclohexyl, phenyl, or alkylphenyl bound directly to carbon or by way of an oxygen or sulfur atom, or morpholino or dialkylamino; and Z is oxygen or sulfur. Methods of making said compounds by reacting a ketamine or mixture of ketamines with a compound of the formula

where Y is chlorine or bromine, of with a compound of the formula

to form an intermediate which is subsequently oxidized with oxygen or sulfur. Specific bis-methylenes of a phosphonic acid in which X is hydrocarbyl or dialkylamino.

---

The present invention relates to bis-methylene amides of phosphoric or phosphonic acids and their thio-derivatives and to a process for preparing them.

More particularly, the present invention provides bis-methylene-amides of phosphoric or phosphonic acids and their thio-derivatives of the general Formula I

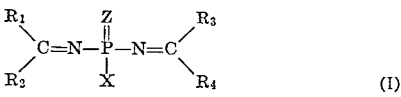

wherein $R_1$, $R_2$, $R_3$ and $R_4$, which may be identical or different, each represent lower alkyl radicals, especially such alkyl radicals containing 2 to 6 carbon atoms, the cyclohexyl or phenyl, mono- or di-chloro- or bromophenyl radical or an alkylphenyl radical containing 1 to 4 carbon atoms in the alkyl groups, or $R_1$ and $R_2$ as well as $R_3$ and $R_4$, respectively, together stand for an alkylene radical containing 4 to 5 carbon atoms as part of a cycloalkyl radical, X represents an alkyl radical containing 1 to 12 carbon atoms, the cyclohexyl, phenyl or an alkylphenyl radical containing 1 to 9 carbon atoms in the alkyl group, which radicals may be bound to the phosphorus atom via oxygen or sulfur, or a morpholino or dialkylamino radical the alkyl groups of which contain 1 to 4 carbon atoms, and Z represents oxygen or sulfur.

Furthermore, the present invention provides a process for preparing the compounds of the general Formula I

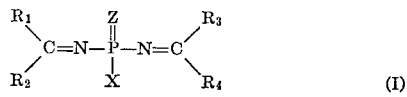

in which $R_1$, $R_2$, $R_3$ and $R_4$, X and Z have the meanings given above, wherein a ketimine of the general Formula II

in which $R_1$ and $R_2$ have the meanings given above, or a mixture of such ketimines, in an organic solvent and in the presence of anhydrous bases for binding the hydrogen halide set free, is reacted either with a dihalogeno-phosphorus compound of the general Formula III

in which X has the meaning given above and Y stands for chlorine or bromine, and is then exposed to the action of an oxidizing agent or sulfur to form the compounds of Formula I, or is reacted with a dihalogeno-phosphorus compound of the general Formula IV

wherein X, Z and Y have the meanings given above, to form directly the compounds of the Formula I.

The reaction of the ketimines with the dihalogeno-phosphorus compounds of the Formulas III or IV proceeds smoothly at temperatures in the range of from about −30° C. to about +80° C. Preferably, the reaction is carried out at 0 to +30° C. in the absence of oxygen, suitably under an inert atmosphere, for example under nitrogen or carbon dioxide.

As anhydrous bases for binding the hydrogen halide set free during the reaction, there may be used for example bases that contain tertiary nitrogen atoms, for example pyridine, triethylamine, picoline, dialkyl-aniline, lutidine or even alkali alcoholates. As organic solvents, there may be used those which are inert towards the reaction partners and which dissolve the starting materials to a sufficient degree. There may be mentioned, for example dialkyl ethers, aliphatic or aromatic hydrocarbons, halogenated hydrocarbons, nitriles or mixtures of such solvents. If suitable organic bases are selected, these may simultaneously serve as solvents.

If compounds of the Formula III are reacted with the ketimines, the reaction yields at first the corresponding diamides of phosphorous acid of the general Formula V

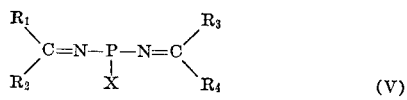

in which $R_1$, $R_2$, $R_3$, $R_4$, and X have the meanings given above. These intermediate products are converted, preferably without isolation, directly in the same reaction batch, suitably at a raised temperature, by the action of sulfur or of an oxidizing agent into the claimed compounds of the general Formula I. This further reaction of the intermediate products is suitably carried out at temperatures in the range of from about 30 to 100° C., preferably at 50 to 60° C. As oxidizing agent, there may be used, for example the oxygen of the air or pure oxygen. Oxygen-yielding compounds such as hydrogen peroxide or manganese dioxide may also be used. The reaction with sulfur can be effected by addition of sulfur powder or of a solution of sulfur, for example in carbon disulfide.

For preparing compounds of the Formula I in which Z represents oxygen, in most cases reaction of the ketimines with phosphoryl dichlorides of the Formula IV wherein Z=oxygen is chosen.

As ketimines of Formula II, which may be used in the process of the present invention, there may be mentioned, for example, diphenyl-ketimine, phenyl-tolyl-ketimine, di-(p-dimethylaminophenyl)-ketimine, di-(4-dimethylamino-3-methyl-penyl)-ketimine, butyl-phenyl-ketimine, butyl-p-tolyl-ketimine, n-propyl-isopropyl-ketimine, n-butyl-isobutyl-ketimine, di - n - butyl-ketimine, isopropyl-p-tolyl-ketimine, bis - (4 - chlorophenyl)-ketimine, bis-(2,4-dichlorophenyl)-ketimine. The ketimines used as starting materials may also be used in the form of their hydrochlorides or hydrobromides.

As dihalogeno-phosphorous compounds of Formula III, which may be used in the process of the present invention, there may be mentioned, for example, the following compounds: methylphosphonic acid dichloride, ethylphosphonic acid dichloride, butylphosphonic acid dichloride, n-dodecylphosphonic acid dichloride, cyclohexylphonic acid dichloride, dichlorophosphorous acid methyl ester, dichlorophosphorous acid ethyl ester, dichlorophosphorous acid n-butyl ester, dichlorophosphorous acid n-hexyl ester, dichlorophosphorous acid - N,N - dimethylamide, dichlorophosphorous acid-N,N-diethylamide, dichlorophosphorous acid-N,N-dibutylamide, dichlorophosphorous acid - morpholineamide, dichloro - phenylphosphine, dichlorophosphorous acid phenyl ester, as well as the corresponding bromine compounds.

As dihalogeno-phosphorus compounds of Formula IV, which may be used for the direct preparation of the compounds of the invention of Formula I, there may be mentioned, for example, the following compounds: methylphosphonic acid dichloride, methylthiophosphonic acid dichloride, ethylphosphonic acid dichloride, ethylthiophosphonic acid dichloride, butylphosphonic acid dichloride, butylthiophosphonic acid dichloride, n-dodecylphosphonic acid dichloride, n-dodecylthiophosphonic acid dichloride, dichlorophosphorous acid methyl ester, dichlorothiophosphorous acid methyl ester, dichlorophosphorous acid ethyl ester, dichlorothiophosphorous acid ethyl ester, dichlorothiophosphorous acid thio-ethyl ester, dichlorophosphorous acid-N,N-dimethylamide, dichlorothiophosphorous acid-N,N-dipropylamide, phenylphosphonic acid dichloride, phenylthiophosphonic acid dichloride, p-tolylphosphonic acid dichloride, dichlorophosphorous acid phenyl ester, dichloro-thiophosphorous acid phenyl ester, dichloro-thiophosphorous acid-thiophenyl-ester, dichlorophosphorous acid-phenyl ester. The corresponding bromine compounds are likewise suitable.

The new compounds can be isolated in pure form preferably by separation of the hydrohalide of the organic bases or, if alkali alcoholates are used, of the alkali halide formed, removal of the solvent by distillation under reduced pressure and, if desired or required, by recrystallization from organic solvents. The novel compounds constitute colorless or yellowish crystalline substances or liquids which are readily soluble in many organic solvents such as alcohols, aliphatic ethers and ketones, aliphatic and aromatic hydrocarbons, esters such as ethyl acetate, and in mineral oils.

Owing to their extraordinarily advantageous antioxidizing action and to their favorable thermic stabilizing properties, in combination with a very low volatility, the compounds of the present invention are highly effective as additives to lubricants that are exposed to a high thermal stress in an oxidizing atmosphere, for example motor oils. The novel additives may also be used for the stabilization of other aliphatic or aromatic hydrocarbons or of mineral oil products, for example asphalt, as well as for the stabilization of synthetic or natural high polymers, for example rubber, or of polyolefins.

It is already known to add certain additives to lubricants in order to stabilize them or to prevent oxidation. Many of these known antioxidants, however, have the disadvantage of causing contamination of the lubricant (sludge formation) or of increasing the viscosity and thus causing deterioration of the lubricating properties. Moreover, some of the known additives promote the formation of residues, especially in lubricants that are exposed to high thermal stresses. It is a special advantage of the products of the present invention that they do not entail the above-mentioned disadvantages of the known additives.

When the products of the present invention are used as additives to lubricants, which is one of the most important applications of these products, they are generally used in quantities of about 0.01 to about 10%, referred to the weight of unblended lubricant. Preferably, concentrations of about 0.1 to 5% by weight and especially 0.3 to 3% by weight are used.

A series of tests has been carried out with the additives of the present invention in order to demonstrate the advantageous activity of these products. Under conditions that permit comparison, known antioxidants have likewise been used in the tests. For testing the thermal stabilizing properties of the additives, the so-called "hot-plate test" was used, wherein the oil to which the additive to be tested has been added is pumped over a heated metal plate which is exposed to the atmosphere and wherein the residues that have deposited on the plate are determined (cf. dissertation W. Wolf, No. 7539 of May 1957, Technische Hochschule Karlsruhe, "Über die Prüfung des Detergent-Dispersant-Effektes von Motorenschmierölen mit Wirkstoffzusätzen").

For testing the stability to oxidation of lubricants containing the additives of the present invention, the socalles Dornte method (cf. "Industrial and Engineering Chemistry," vol. 34 (1942), page 927) was used; in this test the time is measured which is required for the absorption of 25 cc. of oxygen in hot oil, with and without addition of the antioxidant. Finally, in a supplementary test, the lubricating properties under extreme pressure of oils blended with the additives of the present invention were tested by the test for the load carrying capacity on the 4-ball engine (Federal Test Method Standard No. 791a of 31.12.1961, General Services Administration, Washington, D.C., U.S.A., Method 6503) and compared with the corresponding value for unblended lubricating oil.

The following examples illustrate the invention but they are not intended to limit it thereto.

EXAMPLE 1

20.0 g. (0.115 mol) of n-dichlorophosphorous acid butyl ester were added dropwise, while cooling with ice, to a solution of 41.5 g. (0.229 mol) of diphenyl-ketimine and 23.2 g. (0.229 mol) of triethylamine in 300 ml. of benzene. After heating to room temperature, 3.7 g. (0.115 mol) of sulfur powder were added and the whole was heated for 2 hours to 50° C. After cooling to 20° C., the triethylamine hydrochloride was filtered off with suction, the filtrate was evaporated under reduced pressure and the residue was recrystallized twice from ethanol. There were obtained 44 g. (77% of the theory) of the compound.

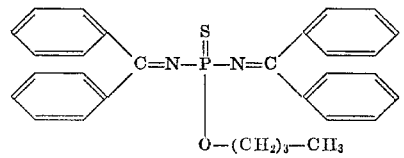

Melting point: 126° C.

$C_{30}H_{29}N_2OPS$ (496.6).—Calc. (percent): C, 72.5; H, 5.9; N, 5.6; P, 6.3; S, 6.5. Found (percent): C, 72.9; H, 5.8; N, 5.6; P, 6.6; S, 6.6.

EXAMPLE 2

11.3 g. (0.086 mol) of dichlorophosphorous acid ethyl ester in 25 ml. of benzene were added, while cooling with ice, to a solution of 31 g. (0.17 mol) of diphenyl-ketimine and 15.8 g. (0.17 mol) of picoline in 300 ml. of benzene. The reaction mixture was heated to 20° C. and combined with 2.76 g. (0.086 mol) of sulfur powder and heated for one hour to 50° C. After cooling, the picoline hydrochloride that had formed in a quantity of 21.4 g. (97% of the theory) was filtered off. From the filtrate, the solvent was removed by distillation under reduced pressure and the residue was recrystallized from a mixture of benzene and petroleum ether. There were obtained 24.0 g. (62.5% of the theory) of the compound of the formula

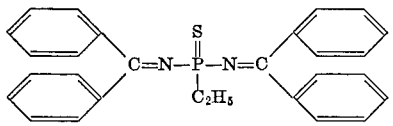

which had crystallized in the form of prisms.
Melting point: 164–165° C.
$C_{28}H_{25}N_2PS$ (452.6).—Calc. (percent): C, 74.3; H, 5.6; N, 6.2; P, 6.9; S, 7.1. Found (percent): C, 74.2; H, 5.9; N, 6.4; P, 7.2; S, 7.2.

EXAMPLE 3

29.5 g. (0.16 mol) of diphenyl-ketimine and 16.5 g. (0.16 mol) of triethylamine were dissolved in 300 ml. of benzene. 15.0 g. (0.08 mol) of dichlorophosphorous acid-N,N-diethylamide in 30 ml. of benzene were added dropwise, while cooling with ice. The mixture was heated to room temperature, 2.6 g. (0.08 mol) of sulfur powder were added and the whole was heated for one hour to 50° C. After working up as described in Example 2, the residue was recrystallized from a large amount of ethanol. There were obtained 25.4 g. (64.2% of the theory) of compound of the formula

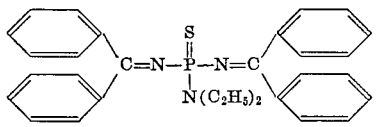

Melting point: 138° C.
$C_{30}H_{30}N_3PS$ (495.6).—Calc. (percent): C, 72.7; H, 6.1; N, 8.5; S, 6.5; P, 6.2. Found (percent): C, 72.8; H, 6.0; N, 8.5; S, 6.5; P, 6.6.

EXAMPLE 4

21.1 g. (0.1 mol) of phenyl-thiophosphonic acid dichloride were added, at 20° C., to a solution of 36.2 g. (0.2 mol) of diphenyl-ketimine and 20.2 g. (0.2 mol) of triethylamine in 300 ml. of benzene. The whole was then heated for one hour under reflux. After cooling, the triethylammonium chloride (21 g.=76% of the theory) that had separated was filtered off. The filtrate was washed with water, dried and concentrated under reduced pressure. The residue was recrystallized from a mixture of benzene and petroleum ether. There were obtained 42 g. (84% of the theory) of the compound

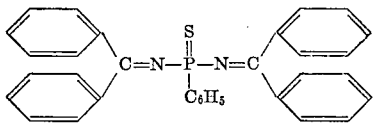

Melting point: 151–152° C.
$C_{32}H_{25}N_2SP$ (500.5).—Calc. (percent): C, 76.8; H, 5.0; N, 5.6; P, 6.4; S, 6.2. Found (percent): C, 77.1; H, 5.1; N, 5.7; P, 6.6; S, 6.4.

EXAMPLE 5

36.2 g. (0.2 mol) of diphenyl-ketimine and 15.8 g. (0.2 mol) of pyridine were dissolved in 200 ml. of anhydrous diethyl ether and combined at 0° C. with 16.3 g. (0.1 mol) of dichlorophosphorous acid ethyl ester. The whole was then boiled for 2 hours under reflux. After cooling, 18.5 g. (80% of the theory) of pyridine hydrochloride were separated by suction-filtration; the filtrate was washed with water, dried and concentrated under reduced pressure. The residue was recrystallized several times from petroleum ether and a mixture of benzene and petroleum ether. There were obtained 18 g. (40% of the theory) of the compound

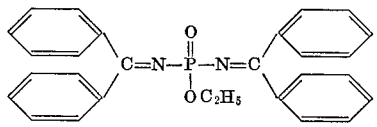

Melting point: 130.5–131° C.
$C_{28}H_{25}N_2O_2P$ (452.5).—Calc. (percent): C, 74.3; H, 5.6; N, 6.2; P, 6.9. Found (percent): C, 74.0; H, 5.7; N, 6.1; P, 6.6.

EXAMPLE 6

18.1 g. (0.1 mol) of diphenyl-ketimine and 8.0 g. (0.1 mol) of pyridine were dissolved in 200 ml. of benzene. 9.0 g. (0.05 mol) of dichlorophenyl-phosphine were added to this solution and the whole was heated to 60° C. Then, a stream of air was passed for 5 hours through the solution, through a glass frit. After having cooled, the solution was washed, dried and the benzene was separated by evaporation under reduced pressure. The residue was recrystallized from a mixture of benzene and petroleum ether. There were obtained 20.7 g. (85.5% of the theory) of a substance of the formula

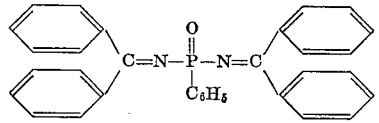

Melting point: 143–146° C.
$C_{32}H_{25}N_2OP$ (484.5).—Calcd. (percent): C, 79.4; H, 5.2; N, 5.8; P. 6.4. Found (percent): C, 79.1; H, 5.5; N, 6.1; P, 6.6.

EXAMPLE 7

A solution of 21.8 g. (0.076 mol) of dichlorophosphorous acid-n-dodecyl ester in 30 ml. of benzene was added to a solution of 20.0 g. (0.152 mol) of n-propyl-isopropyl-ketimine and 18.8 g. (0.152 mol) of N,N-dimethyl-aniline in 300 ml. of benzene. After one hour's stirring, 2.43 g. (0.076 mol) of sulfur powder were added and the whole was heated for one hour to 50° C. After separation of the dimethyl-aniline hydrochloride (23.2 g.=96.8% of the theory), the solvent was eliminated by evaporation under reduced pressure and the residue was treated for further 5 hours at 40° C./0 mm. Hg. There were obtained 34 g. of the compound

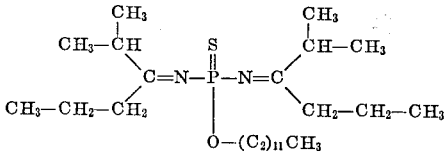

$C_{26}H_{53}N_2OPS$ (472.7).—Calcd. (percent): C, 66.0; H, 11.2; N, 5.9; P, 6.6; S, 6.8. Found (percent): C, 65.3; H, 11.4; N, 5.7; P, 7.0; S, 6.8.

The compounds corresponding to the formula

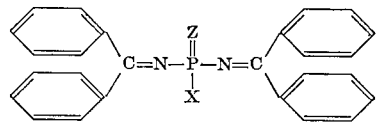

listed in the following table were likewise prepared according to the methods described above.

TABLE 1

| Example No. | X | Z | Melting point, °C. | Calcd. C | Calcd. H | Calcd. N | Calcd. P | Calcd. S | Found C | Found H | Found N | Found P | Found S |
|---|---|---|---|---|---|---|---|---|---|---|---|---|---|
| 8 | $CH_3O-$ | S | 79–81 | 71.4 | 5.1 | 6.1 | 6.8 | 7.1 | 71.6 | 5.4 | 5.7 | 7.0 | 6.9 |
| 9 | $C_2H_5O-$ | S | 149 | 72.0 | 5.4 | 6.0 | 6.6 | 6.9 | 72.2 | 5.7 | 6.5 | 7.0 | 7.0 |
| 10 | $(CH_3)_2CHCH_2O-$ | S | 150 | 72.5 | 5.8 | 5.6 | 6.3 | 6.5 | 72.7 | 5.8 | 5.4 | 6.4 | 6.9 |
| 11 | $CH_3(CH_2)_{11}-O-$ | S | Liquid | 75.0 | 7.5 | 4.6 | 5.1 | 5.3 | 74.3 | 7.6 | 4.6 | 5.1 | 5.4 |
| 12 | C₆H₅—O— | S | 137 | 73.1 | 5.1 | 5.7 | 6.3 | 6.5 | 73.3 | 5.0 | 5.5 | 6.3 | 6.5 |
| 13 | (morpholino)N— | S | 86–88 | 42.8 | 7.9 | 10.0 | 11.0 | 11.4 | 42.4 | 7.7 | 10.1 | 11.9 | 11.8 |

In order to demonstrate the advantageous properties of the products of the present invention as additives to lubricants, the following tests were carried out:

(a) Test for thermal stability 500 g. of a mixture of Kirkuk mineral oils of the types HVI 160 B and HVI 65, at a ratio by weight of 1:4, were pumped for 5 hours over a slanted stainless steel plate that was heated electrically to 280° C. The oil contained the substance to be tested in a quantity of 0.75% by weight. Thereafter the plate was washed with acetone and dried. The quantity of residue was determined by weighing of the plate prior to and after the test.

(b) Test for stability to oxidation 0.75% by weight of the substance to be tested were dissolved in samples of a mineral oil mixture as that described under (a), with addition of 15 p.p.m. of iron and 20 p.p.m. of copper in the form of iron and copper stearate as catalysts. The whole was placed into a closed system and then oxygen was pumped through the oil. The time required for the absorption of 25 ml. of oxygen was determined. The test was carried out at 160° C.

The results of these tests are shown in the following Table 2. In this table, the numbers in the column under "additive" refer to the foregoing examples and indicate the compounds described in these examples with their formula and their method of preparation. For comparison and in order to demonstrate the superior action of the products of the present invention, the additives of the known compounds (A) and (B) known as additives were also used in the test. Product (A) was the compound 1,1-bis-(3,5-ditert.butyl-4-hydroxyphenyl)-methane; this compound is known as an additive to lubricants from U.S. Pat. 2,807,653 (Example 1). Product (B) was the compound N,N'-bis-(diphenylamido)-thiophosphoric acid-O-ethyl ester of the formula

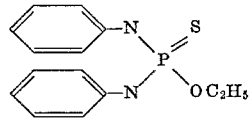

known from Houben-Weyl, "Methoden der Organischen Chemie," 4th edition, volume 12/2, page 775; this compound is with regard to its chemical constitution, the closest comparable compound to the new compounds of the present invention.

TABLE I

| Additive | (a) Residue (mg.) | (b) Oxidation (min.) |
|---|---|---|
| Example No.: | | |
| 1 | 4.3 | 220 |
| 2 | 104.8 | 275 |
| 3 | 17.6 | 355 |
| 4 | 64.6 | 345 |
| 7 | 7.5 | 280 |
| 9 | 38.0 | 250 |
| 12 | 40.6 | 280 |
| Without | | 20 |
| A | 200.0 | 185 |
| B | 150.0 | 100 |

Finally, the lubricating properties under extreme pressure of some of the products of the present invention were determined according to the load carrying capacity test on a 4-ball engine. For this purpose, 5% of the compounds to be tested were dissolved in spindle oil having a mixed basicity and a viscosity of 6.6° E. (20° C.) and the oil so blended was subjected to the test for the load carrying capacity. For comparison, the test was also carried out with unblended oil. The results of these tests are shown in the following Table 3. In this table too, the numbers in the column under "additive" refer to the foregoing examples.

TABLE II

| Additive (Example No.): | Load carrying capacity (kp.) |
|---|---|
| 2 | 210 |
| 3 | 210 |
| 5 | 210 |
| 6 | 210 |
| Without | 170 |

We claim:
1. A bis-methylene-amide of a phosphonic acid, and its thio-derivative, of the formula

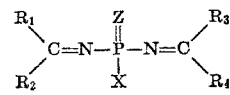

wherein $R_1$, $R_2$, $R_3$, and $R_4$, taken alone, are the same or different and are alkyl having 2 to 6 carbon atoms, cyclohexyl, phenyl, monochlorophenyl, dichlorophenyl, bromophenyl, or alkylphenyl having 1 to 4 carbon atoms in the alkyl group; $R_1$ and $R_2$ taken together, or $R_3$ and $R_4$ taken together, are alkylene having 4 or 5 carbon atoms; X is alkyl having 1 to 12 carbon atoms, cyclohexyl, phenyl, alkylphenyl having 1 to 9 carbon atoms in the alkyl group, or dialkylamino having 1 to 4 carbon atoms in the alkyl groups; and Z is oxygen or sulfur.

2. The compound of the formula

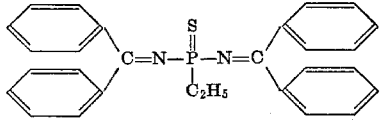

3. The compound of the formula

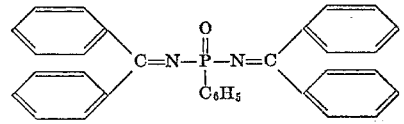

4. The compound of the formula

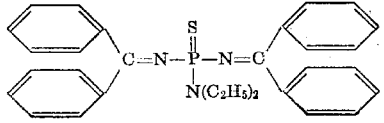

5. The compound of the formula
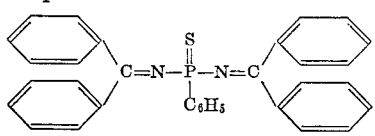
References Cited
UNITED STATES PATENTS
2,552,541   5/1951   Drake et al. _____ 260—959 X
2,852,550   9/1958   Godfrey _____ 260—99 X
3,223,514   12/1965  Gradsten.
3,328,495   6/1967   Anders et al. _____ 260—959
JOSEPH REBOLD, Primary Examiner
R. L. RAYMOND, Assistant Examiner
U.S. Cl. X.R.
252—47.5, 49.9; 260—247.1, 247.5 R, 959, 984